Sept. 7, 1937.     D. FIRTH     2,092,246
THERMOSTATIC HEAT CONTROL
Filed Sept. 16, 1931     3 Sheets-Sheet 1
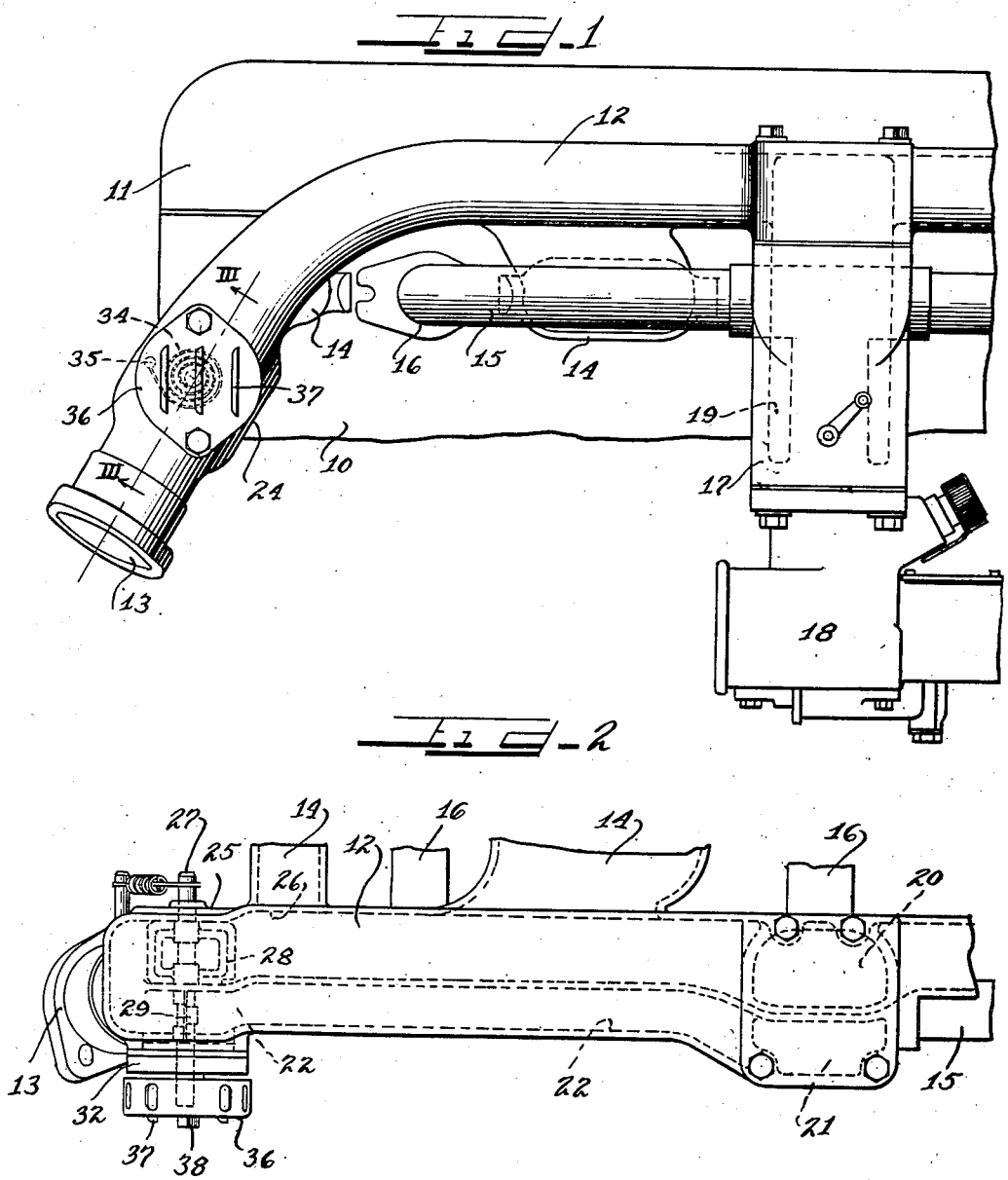
Inventor
David Firth.
by Charles Miller
Attys.

Sept. 7, 1937.　　　　　D. FIRTH　　　　　2,092,246
THERMOSTATIC HEAT CONTROL
Filed Sept. 16, 1931　　　3 Sheets-Sheet 2
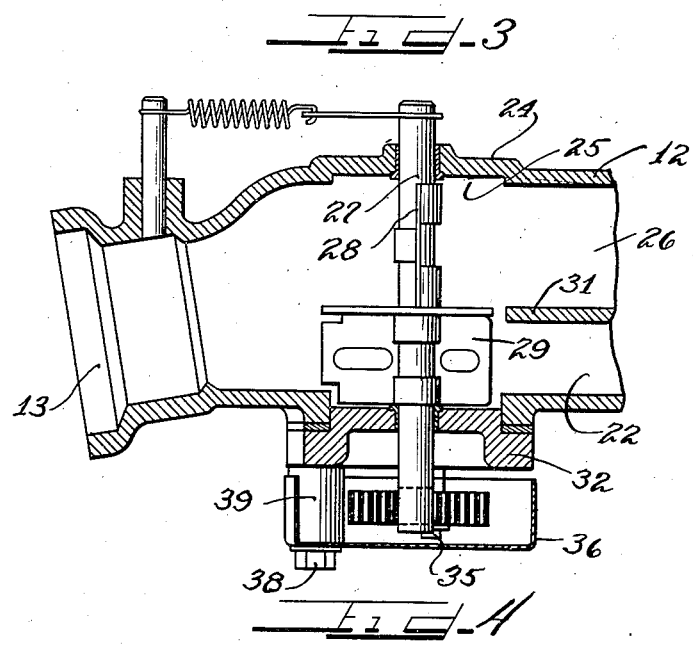
FIG. 3
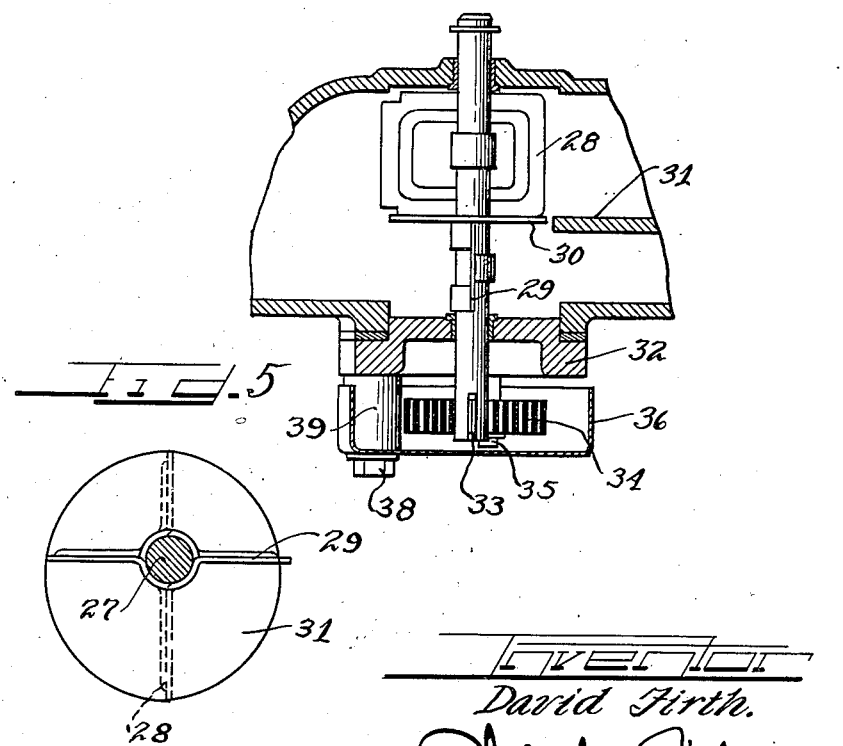
FIG. 4
FIG. 5
Inventor
David Firth.

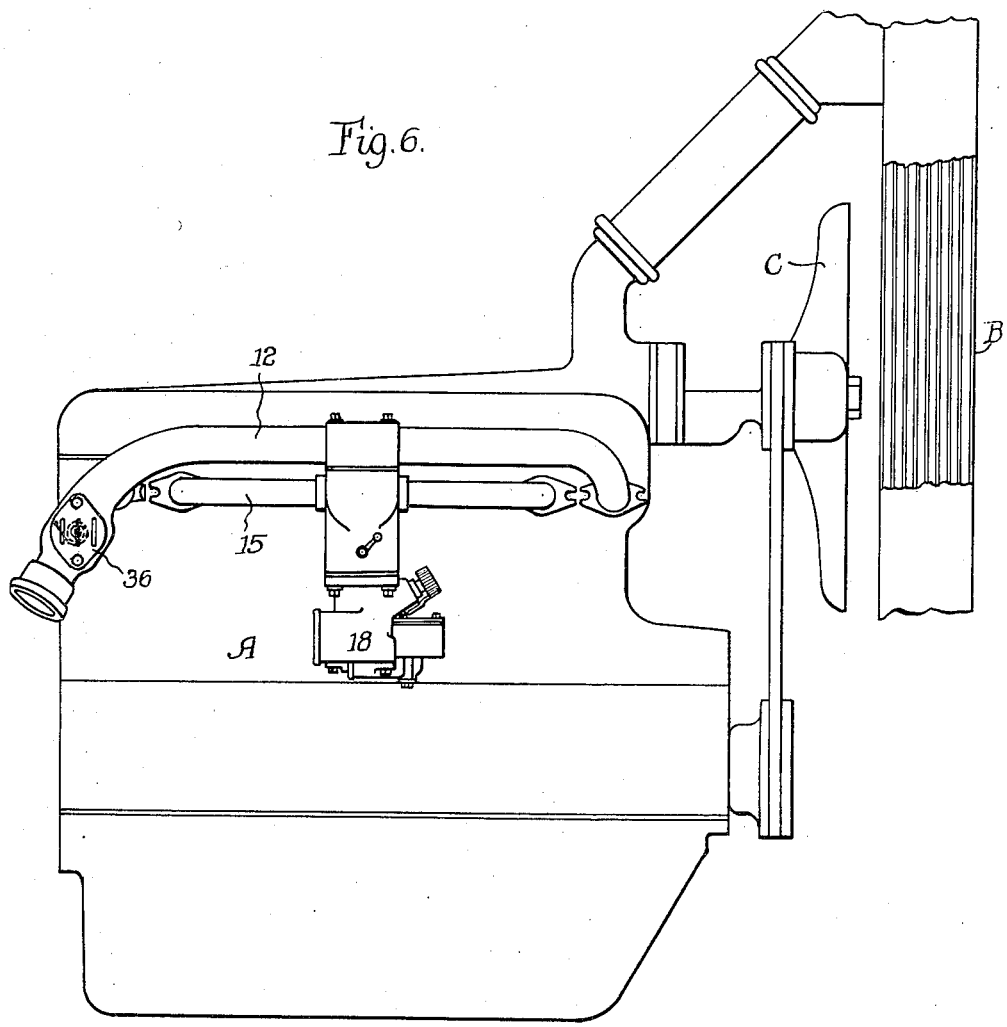

Patented Sept. 7, 1937

2,092,246

UNITED STATES PATENT OFFICE 2,092,246

THERMOSTATIC HEAT CONTROL

David Firth, Flint, Mich., assignor, by mesne assignments, to Borg-Warner Corporation, Chicago, Ill., a corporation of Illinois Application September 16, 1931, Serial No. 563,131

15 Claims. (Cl. 123—122)

This invention relates to an improved thermostatic heat control for automatically governing the supply of heat to the induction system of a carbureter type internal combustion engine.

It is an object of this invention to provide an improved and simplified thermostatic heat control adapted to automatically compensate for temperature variations of the engine and climate without the necessity of complicated or fragile operating connections. Heretofore various systems of heat control have been developed embodying the diversion of exhaust gases through a heating jacket and various operating systems have been provided including both throttle and thermostatic controls. My present invention involves simplifications and improvements thereover in eliminating complicated external control linkages and in providing a direct and troubleproof thermostatic control that will yield to excessive exhaust gas back pressures.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary side elevation of the manifolding system of an internal combustion engine embodying the features of this invention.

Figure 2 is a fragmentary plan view of the manifolds of Figure 1.

Figure 3 is an enlarged fragmentary detail section of the heat control valve in its heat-on position on the line III—III of Figure 1.

Figure 4 is a fragmentary detail section corresponding to Figure 3, but with the valve turned to its heat-off position.

Figure 5 is an end view of the unbalanced valve.

Fig. 6 is a side elevation of the invention embodied in an automobile engine.

As shown on the drawings:

An internal combustion engine cylinder block 10 and cylinder head 11 are indicated in Figure 1 to identify the manifolding system, which comprises an exhaust manifold 12 having an outlet connection 13 and branches 14 collecting exhaust gases from exhaust ports in the cylinder block. Similarly, an intake manifold 15 has branches 16 connected to intake ports in the cylinder block, which intake ports are commonly alternated with the exhaust ports, the ports for either manifold being Siamesed for adjacent cylinders if desired. The intake manifold 15 is fed by a central jacketed riser 17 from a carbureter 18, the riser jacket 19 having an entrance port 20, indicated in dotted lines in Figure 2, and a return or discharge port 21, similarly indicated, which discharges into a separate bypass passage 22 formed in the exhaust manifold and extending therealong to a valve housing 24 formed in said manifold, preferably adjacent to the outlet connection 13 if it is desired to have the exhaust gases from all the cylinders available for heating purposes.

The valve housing 24 mentioned above forms a substantially cylindrical chamber 25 at right angles to and intersecting both the main exhaust passage 26 in the manifold and the bypass passage 22. A control valve shaft 27 is disposed in the chamber 25 and carries unbalanced valve members 28 and 29 aligned respectively with the main and bypass passages 26 and 22. The two valve members are disposed at right angles to each other on opposite sides of a partition disc 30 disposed on the shaft in alignment with the partition 31 in the manifold between the passages 26 and 22. With this disposition of the valve members, when one passage is blocked by its valve the valve in the other passage will be disposed in alignment with the gas flow, a quarter turn of the valve shaft 27 serving to reverse the position of both valves. The disc 30 prevents cross-flow from the passage 22 to the passage 26 when the valve 29 closes the end of the passage 22. One end of the valve shaft 27 projects through a removable closure 32 forming one end of the chamber 25 and its outer end is slotted to receive one end 33 of a spiral coiled bimetallic thermostatic device 34, the other end of which is anchored to a pin 35 on the closure 32. The thermostatic coil may be arranged to either wind up or uncoil with an increase of temperature as desired, since the valves can be arranged to be operative in either direction of rotation. By way of illustration, the thermostatic device as shown on the drawings is intended to coil up tighter as operating temperatures increase, so that the valves will be turned counter-clockwise from the position of Figure 3 to the position of Figure 4 to cut off the heat supply to and from the intake manifold jacket 19.

The thermostat is subject to manifold heat by radiation and conduction along the shaft and to the air temperature in the engine compartment, a cover 36 spaced from the closure 32 being provided with louvers 37 to facilitate air flow about the thermostatic coil. Both the cover 36 and closure 32 are held in place by cap screws 38, spacers 39 being provided between the cover and the closure.

The unbalanced main exhaust valve 28 is offset to permit high exhaust pressures to open the valve against the action of the thermostat in order to prevent the creation of excessive back pressure when the engine is called on to develop nearly full power before the thermostat has started to open the main exhaust valve.

In Fig. 6 the cylinder block 10 is shown embodied in an internal combustion engine A provided with a cooling radiator B and a cooling fan C, these parts being generally old and well-known in the art.

In the operation of the heat control of this invention, if starting a cold engine be considered first, the heat control valves will be in the normal or cool position of Figure 3, wherein the valve 28 substantially blocks the normally clear exhaust passage 26, causing the gases from all the cylinders to pass down through the port 20 into the jacket 19, circulate about the intake manifold riser 17 and leave the jacket through the port 21 and bypass passage 22 where a clear outlet is provided by the open bypass valve 29. As the engine warms up and the air in the engine compartment is warmed thereby both the heat of the exhaust and that of the air will influence the thermostatic element to rotate the control valves towards the position of Figure 4, the extent of the movement depending principally on the air temperature immediately adjacent the thermostatic coil. If an impatient driver opens up almost immediately after starting the engine the increased volume and pressure of the exhaust gases due to an opened throttle will act on the unbalanced valve 28 to cause an opening movement thereof to relieve the back pressure. After the engine has warmed up, the rise in temperature of the engine compartment, assisted by the radiation from the manifold, will serve to actuate the thermostat to partially or fully rotate the valves to open the exhaust passage and cut off the bypass or jacket outlet passage, thus decreasing or shutting off the flow of heating gases through the intake manifold heating jacket.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A manifolding system for internal combustion engines comprising an exhaust manifold and an intake manifold having an exhaust gas heated jacket associated therewith and having an inlet connection from the exhaust manifold, an outlet from the heated jacket formed as a separate passage integral with the exhaust manifold, a valve chamber housing in said exhaust manifold into which both the exhaust manifold and the separate passage discharge, a valve shaft positioned in said valve chamber housing, separate valves carried by said shaft in alignment with the exhaust manifold and with the jacket outlet passage respectively, the valves being so arranged on the shaft that one passage will be closed when the other is open, and vice versa, a coiled bimetallic thermostatic member exterior to the housing, one end of which member engages the shaft to rotate the same, the other end being anchored whereby coiling or uncoiling of the thermostatic member rotates the shaft and the valves associated therewith to vary the path of flow of the exhaust gases, said thermostatic member being spaced from the walls of the housing and exhaust manifold, and a perforated cover partially enveloping said thermostatic member.

2. A manifolding system for internal combustion engines comprising an exhaust manifold and an intake manifold having an exhaust gas heated jacket associated therewith and having an inlet connection from the exhaust manifold, an outlet from the heated jacket formed as a separate passage integral with the exhaust manifold and extending therealong to a position adjacent the exhaust manifold outlet, a valve chamber housing forming a juncture between the exhaust manifold and said jacket outlet passage, a valve shaft in said housing, separate valves thereon in alignment with the exhaust and outlet passages, the valves being so disposed on the shaft that one valve will be fully open when the other is closed, said valves being separated by a division disc in alignment with the walls between the two passages, and thermostatic means carried by the shaft exterior to said valve chamber housing and subject to atmospheric temperatures, for operating said valve shaft to control the diversion of exhaust gases through said intake manifold heating jacket.

3. A heat diversion valve for the manifolding systems of internal combustion engines, said manifolding systems including interconnected exhaust and intake manifolds and a heating jacket for the intake manifold having supply and return ducts for the passage of hot gases from the exhaust manifold to the intake manifold heating jacket and back to the exhaust manifold, a diversion valve chamber in the exhaust manifold into which one of the ducts opens, an unbalanced butterfly valve mounted on a shaft in said chamber with its axis located posterior to the opening of the duct into the chamber, said valve in one position being adapted to yieldingly force a circulation of exhaust gases through the heating jacket by opposing the flow of such gases through the exhaust manifold, a cover for said chamber, and a coiled spring type of thermostat mounted on one end of the shaft exteriorly of the cover and adapted to yieldingly control the position of the unbalanced valve in opposition to the tendency of the pressure of the exhaust gases thereon to open the valve, the cover, valve, shaft and thermostat being removable as a unit without disturbing the thermostat adjustment.

4. A heat diversion valve for the manifolding systems of internal combustion engines, said manifolding systems including interconnected exhaust and intake manifolds and a heating jacket for the intake manifold having supply and return ducts for the passage of hot gases from the exhaust manifold to the intake manifold heating jacket and back to the exhaust manifold, a diversion valve chamber in the exhaust manifold into which one of the ducts opens, an unbalanced butterfly valve mounted on a shaft in said chamber, said valve being arranged to alternately close either the exhaust manifold or the duct opening into the chamber, said valve in one position being adapted to yieldingly force a circulation of exhaust gases through the heating jacket by opposing the flow of such gases through the exhaust manifold, a cover for said chamber, and a coiled spring type of thermostat mounted on one end of the shaft exteriorly of the cover and adapted to yieldingly control the position of the unbalanced valve in opposition to the tendency of the pressure of the exhaust gases thereon to open the valve, the cover, valve, shaft and thermostat being removable as a unit without disturbing the thermostat adjustment.

5. A heat diversion valve for the control of the flow of exhaust gases from an exhaust manifold to a heating jacket on an intake manifold, comprising a cylindrical valve chamber transversely disposed in the exhaust manifold and open at one end, said chamber having a duct from the heating jacket opening thereinto, a shaft mounted in parallel offset relationship to the axis of said valve chamber, a butterfly valve in said chamber and carried by said shaft, unequal portions of said valve being disposed on opposite sides of the shaft whereby exhaust pressure in said exhaust manifold will have a tendency to open said valve, the exhaust passage and the duct opening into the chamber being alternately closed and opened by a partial rotation of said valve, a removable cover for said valve chamber, said cover being apertured for the shaft and a coiled spring thermostat engaged between the shaft and the cover externally of the valve chamber whereby the valve, shaft, cover and thermostat can be removed as a unit without disturbing the assembly.

6. In an internal combustion engine including intake and exhaust manifolds, a heating jacket for the intake manifold including a junction conduit for conveying exhaust gases from the exhaust manifold to said jacket and back to the exhaust manifold, and thermostatically actuated diversion valve means at an end of said conduit for controlling the bypassing of exhaust gases through said conduit, said valve means comprising an unbalanced valve positioned in and transversely to the flow of exhaust gases, a shaft for the valve and a coil thermostat associated with an external end of said shaft and so constructed and positioned as to be responsive to the temperature of the exhaust gases and of the engine proper, said thermostat being connected to said valve through said shaft for opposing the pressure of the exhaust gases on said valve to hold said valve in the closed position so that exhaust gases are bypassed through said conduit until the thermostat is subject to a given temperature, at which time the unbalanced valve is automatically opened to discontinue the bypassing of gases through said conduit, said valve being of a butterfly type and being at all times located in and across the path of the flow of exhaust gases to readily conduct through said shaft the heat of the gases to said thermostat.

7. In an internal combustion engine including intake and exhaust manifolds, in combination, a jacket for heating a portion of the intake manifold having communication with the exhaust manifold for conveying by-passed exhaust gases from the manifold to the jacket and back to the manifold, and thermostatically actuated diversion valve means for controlling the by-passing of exhaust gases through said jacket comprising an unbalanced valve positioned in said exhaust manifold and transversely to the flow of exhaust gases, a shaft for the valve so that the valve may be swung by the force of exhaust gases from a closed position transversely of the exhaust manifold, wherein exhaust gases are by-passed through the jacket, to an open position wherein the gases are free to exhaust without passing through the jacket, and a thermostat directly associated with an external end of said shaft and the manifold and so constructed and positioned as to be responsive to the temperature of the exhaust manifold, said thermostat functioning when the engine is cold yieldingly to hold the valve in its transverse position and, as the temperature of the exhaust manifold rises, to move the valve toward its open position.

8. In an internal combustion engine, in combination, an intake manifold, an exhaust manifold, a heating jacket associated with said intake manifold and having communication with said exhaust manifold to receive exhaust gases therefrom and return the same thereto, a shaft extending transversely of said exhaust manifold and having one end journalled therein, said exhaust manifold having an opening through which the other end of said shaft projects, a cover for said opening providing a journal for the projecting end of said shaft, an unbalanced valve eccentrically fixed on said shaft and adapted to extend transversely of said exhaust manifold to force a circulation of exhaust gases through the heating jacket by opposing the flow of such gases through the exhaust manifold, said valve being rotatable to a position permitting flow of exhaust gases through the exhaust manifold, and a thermostat engaging the projecting end of said shaft and associated with the cover yieldingly to control the position of the valve in opposition to the pressure of the exhaust gases thereon tending to open the valve, said thermostat, cover, valve and shaft being axially removable as a unit from said exhaust manifold.

9. In an internal combustion engine, in combination, an intake manifold, an exhaust manifold, a heating jacket associated with said intake manifold and having communication with said exhaust manifold to receive exhaust gases therefrom and return the same thereto, a shaft extending transversely of said exhaust manifold and having one end journalled therein, an unbalanced valve fixed on said shaft and adapted to extend across said exhaust manifold to force a circulation of exhaust gases through the heating jacket by opposing the flow of such gases through the exhaust manifold, and being rotatable to a position permitting flow of exhaust gases through the exhaust manifold, said exhaust manifold having an opening through which said shaft and said valve are insertable axially and through which one end of said shaft projects, a cover for said opening providing a journal for the projecting end of said shaft, and a thermostat engaging the projecting end of said shaft and associated with the cover yieldingly to control the position of the valve in opposition to the pressure of the exhaust gas thereon tending to open the valve, said cover being removably secured to said exhaust manifold so that the cover, valve, shaft and thermostat may be attached as a unit.

10. A thermostatic control unit for the exhaust manifold of an internal combustion engine having an intake manifold heating jacket in communication therewith and having an opening in one wall thereof, comprising a shaft, an unbalanced valve eccentrically fixed on said shaft and adapted to be inserted with said shaft axially through the opening in the exhaust manifold into controlling position transversely of the exhaust manifold, said valve in one position forcing a circulation of exhaust gases through the heating jacket by opposing the flow through the manifold and in another position permitting flow through the manifold, one end of said shaft projecting through the opening in the manifold and the opposite end journalled in the wall of the manifold, a cover adapted to be attached to the manifold over the opening therein and providing a journal for the projecting end of said shaft, a thermostat having one end in direct engagement with the projecting end of said shaft and the other end associated with said cover to control the position of said valve, and means removably securing said cover to the manifold for the convenient attachment or removal of the control unit.

11. In an internal combustion engine including intake and exhaust manifolds, in combination, a jacket for heating a portion of the intake manifold having communication with the exhaust manifold for conveying by-passed exhaust gases from the manifold to the jacket and back to the manifold, and thermostatically actuated diversion valve means for controlling the by-passing of exhaust gases through said jacket comprising an unbalanced valve positioned in said exhaust manifold and transversely to the flow of exhaust gases, a shaft for the valve so that the valve may be swung by the force of exhaust gases from a closed position transversely of the exhaust manifold, wherein exhaust gases are by-passed through the jacket, to an open position wherein the gases are free to exhaust without passing through the jacket, and a thermostat directly associated with an external end of said shaft and the manifold and so constructed and positioned as to be responsive to the temperature of the exhaust manifold, said thermostat functioning when the engine is cold yieldingly to hold the valve in its transverse position and, as the temperature of the exhaust manifold rises, to permit movement of the valve toward its open position.

12. In an internal combustion engine, in combination, an intake manifold, an exhaust manifold, a heating jacket associated with said intake manifold and having communication with said exhaust manifold to receive exhaust gases therefrom and return the same thereto, and thermostatically and exhaust pressure actuated diversion valve means for controlling the by-passing of exhaust gases through said jacket comprising a shaft rotatably journaled in said exhaust manifold transversely thereof and having an end projecting outwardly therefrom, an unbalanced valve fixed on said shaft and having a closed position in which it diverts exhaust gases through said jacket and an open position wherein the gases are free to exhaust without passing through the jacket, said valve being mounted to be swung by the exhaust gases from closed to open position, and a thermostat directly associated with the projecting end of said shaft and the exhaust manifold so as to be responsive to the temperature of the exhaust manifold and mounted yieldably to resist, with a force decreasing with a rise in temperature, movement of the valve to open position by pressure of the exhaust gases.

13. In an internal combustion engine including intake and exhaust manifolds, in combination, a heater for a portion of the intake manifold having communication with the exhaust manifold for conveying exhaust gases from the manifold to the heater and back to the manifold, and thermostatically actuated diversion valve means for controlling the by-passing of exhaust gases through said heater comprising a shaft extending transversely of the exhaust manifold, an unbalanced valve fixed on said shaft and adapted in one position to extend across said exhaust manifold to restrict the same and thereby to force a circulation of exhaust gases through said heater by opposing the flow of such gases through the exhaust manifold, and being rotatable to another position permitting flow of exhaust gases through the exhaust manifold, the unbalancing of the valve being such that the force of the exhaust gases tends to swing the valve to a position permitting flow through the exhaust manifold, and a thermostat directly associated with an external end of said shaft and so constructed and positioned as to be responsive to the temperature of the exhaust manifold, said thermostat when below a given temperature functioning through said shaft to oppose the pressure of the exhaust gases on said valve to hold said valve in its position across the exhaust manifold so that exhaust gases are by-passed through said heater, a rise in temperature above the given value permitting opening of the valve to discontinue the by-passing of exhaust gases through said heater.

14. In an internal combustion engine including intake and exhaust manifolds, in combination, a jacket for heating a portion of the intake manifold having communication with the exhaust manifold for conveying exhaust gases from the manifold to the jacket and back to the manifold, and thermostatically actuated diversion valve means for controlling the by-passing of exhaust gases through said jacket comprising a shaft extending transversely of the exhaust manifold, a valve fixed on said shaft and adapted in one position to extend across said manifold to restrict the same and thereby to force a circulation of exhaust gases through the heating jacket by opposing the flow of such gases through the exhaust manifold and being rotatable to another position permitting flow of exhaust gases through the exhaust manifold, and a thermostat directly associated with an external end of said shaft and so constructed and positioned as to be responsive to the temperature of the exhaust manifold and functioning when the engine is cold to hold the valve in its position across the exhaust manifold opposing the flow of exhaust gases therethrough, said valve being unbalanced and urged toward open position by the force of the exhaust gases under the control of the thermostat as the temperature of the exhaust manifold rises.

15. In an internal combustion engine including intake and exhaust manifolds, in combination, a jacket for heating a portion of the intake manifold having communication with the exhaust manifold for conveying exhaust gases from the manifold to the jacket and back to the manifold, and thermostatically actuated diversion valve means for controlling the by-passing of exhaust gases through said jacket comprising a shaft extending transversely of the exhaust manifold, an unbalanced valve fixed on said shaft and adapted in one position to extend across said exhaust manifold to restrict the same and thereby to force a circulation of exhaust gases through the heating jacket by opposing the flow of such gases through the exhaust manifold, and being rotatable to another position permitting flow of exhaust gases through the exhaust manifold, the unbalancing of the valve being such that the force of the exhaust gases tends to swing the valve to a position permitting flow through the exhaust manifold, and means comprising a thermostat directly associated with an external end of said shaft and the manifold and so constructed and positioned as to be responsive to the temperature of the exhaust manifold, said means functioning when the engine is cold yieldably to hold the valve in its transverse position and as the temperature of the exhaust manifold rises to move the valve toward its open position.

DAVID FIRTH.